(12) United States Patent
Sasaki et al.

(10) Patent No.: US 6,618,350 B2
(45) Date of Patent: Sep. 9, 2003

(54) REWRITABLE OPTICAL RECORDING MEDIUM AND MANUFACTURING METHOD AND APPARATUS THEREFOR

(75) Inventors: Yoshio Sasaki, Tokorozawa (JP); Toshihiko Maruyama, Tokorozawa (JP); Eiji Muramatsu, Tokorozawa (JP); Masahiro Kato, Tokorozawa (JP); Seiro Oshima, Nakakoma-gun (JP); Takao Tagiri, Nakakoma-gun (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/898,488

(22) Filed: Jul. 5, 2001

(65) Prior Publication Data

US 2002/0021658 A1 Feb. 21, 2002

(30) Foreign Application Priority Data

Jul. 6, 2000 (JP) .................................. 2000-205328

(51) Int. Cl.⁷ .................................................. G11B 7/24
(52) U.S. Cl. ..................................... 369/275.4; 369/277
(58) Field of Search ............................... 369/275.4, 277

(56) References Cited

U.S. PATENT DOCUMENTS

| | | | |
|---|---|---|---|
| 4,769,802 A | | 9/1988 | Tatsuguchi |
| 4,985,881 A | * | 1/1991 | Saito et al. ........... 369/275.4 X |
| 5,402,411 A | * | 3/1995 | Maeda et al. ............. 369/275.1 |
| 5,452,284 A | * | 9/1995 | Miyagawa et al. .. 369/275.4 X |
| 5,553,051 A | | 9/1996 | Sugiyama et al. |

FOREIGN PATENT DOCUMENTS

| | | | |
|---|---|---|---|
| EP | 0626679 A2 | * 11/1994 | ........... G11B/7/007 |
| JP | 07-192272 | 7/1995 | |
| JP | 08-241539 | 9/1996 | |
| JP | 08-306080 | 11/1996 | |
| JP | 09-81968 | 3/1997 | |
| JP | 11-73686 | 3/1999 | |
| JP | 11-120622 | 4/1999 | |
| JP | 11-328738 | 11/1999 | |
| JP | 2000-76718 | 3/2000 | |
| JP | 2000-187887 | 7/2000 | |
| JP | 2001-076349 | 3/2001 | |

* cited by examiner

Primary Examiner—Aristotelis M. Psitos
(74) Attorney, Agent, or Firm—Morgan, Lewis & Bockius LLP

(57) ABSTRACT

A rewritable optical recording medium includes a segmented groove area in which the groove track is segmented along a rotating direction of the recording medium by groove non-forming portions to form a plurality of groove portions; and a continuous groove area in which a continuous groove is formed, the continuous groove having a groove width smaller than a groove width in the segmented groove area.

5 Claims, 9 Drawing Sheets

REWRITABLE OPTICAL RECORDING MEDIUM AND MANUFACTURING METHOD AND APPARATUS THEREFOR

BACKGROUND OF THE INVENTION

1. Field of the Invention

The present invention relates to a rewritable optical recording medium and a manufacturing method and apparatus therefor. More particularly, the present invention relates to a rewritable optical recording medium and manufacturing method and apparatus therefor in which data can be recorded by the user and illegal recording and reproduction of data are disabled.

2. Description of the Related Art

Optical recording media such as a write-once DVD-R (Digital Versatile Disc—Recordable) and a rewritable DVD-RW (DVD—Re-recordable) are being put into practical use or under further development. The discs have a recording capacity of a few gigabytes (GB) and data can be recorded by the user thereon. High-volume data copying can be made with almost no loss of data quality due to the remarkable improvement in performance of the large-capacity digital optical recording media as mentioned above and a recording and reproducing apparatus.

FIG. 1 is a diagram showing a layout of a physical sector in the radial direction on the recording surface of a recorded DVD-ROM (DVD—Read Only Memory). Information data is recorded in an information area. A lead-in area, a data area, and a lead-out area are sequentially provided along the radial direction from a start point of the information area (i.e., start point of the physical sector).

The lead-in area includes data for reproduction of the disc such as a reference code, control data for configuring a reproduction control data signal, and the like as shown in FIG. 2. A control data area is constructed by 192 ECC (Error Correction Code) blocks. In FIG. 2, constructions of the ECC blocks in the control data area are shown by using relative sector numbers 0 to 15. Each of the contents in those ECC blocks are the same control data. In other words, 192 control data of the same contents are sequentially and repetitively recorded. The ECC block consists of 16 sectors. There is recorded in each ECC block important information regarding copy protection including physical format information, disc manufacturing information, and contents provider information. The control data regarding reproduction is recorded into the control data area in the lead-in area when the information data is recorded. When the disc is reproduced, the reproducing apparatus reads the data and executes reproduction of the recorded information data such as video data and the like on the basis of the read information.

If the data in the DVD-ROM disc is RF-copied (i.e., a read signal (RF signal) is recorded as it is by a recording circuit without being subjected to signal processing) into the rewritable DVD-RW disc and the control data is illegally falsified, an illegal DVD-RW disc which cannot be distinguished from the DVD-ROM disc (i.e., an exact or a dead copy of the DVD-ROM disc) can be produced. Since a high quality and a large capacity copy can be easily made by using the DVD-RW disc as mentioned above, development of a copy protection technique is an important subject to prevent a false or illegal copy of the recorded data such as video/audio data, a computer program, or the like.

OBJECTS AND SUMMARY OF THE INVENTION

The present invention is made in consideration of the foregoing problems and it is an object of the present invention to provide a rewritable optical recording medium which prevents illegal recording and reproduction of information data and manufacturing method and apparatus therefor.

To achieve the object, according to one aspect of the present invention, there is provided a rewritable optical recording medium on which a land track and a groove track for recording a data signal are formed, which comprises a segmented groove area in which the groove track is segmented along a rotating direction of the optical recording medium by groove non-forming portions to form a plurality of groove portions; and a continuous groove area in which a continuous groove is formed, the continuous groove having a groove width smaller than a groove width in the segmented groove area.

According to another aspect of the present invention, there is provided A method of manufacturing a master disc for a rewritable optical recording medium having a land track and a groove track for recording a data signal by irradiating a laser beam on the master disc, which comprises the steps of forming a segmented groove track having a plurality of groove portions in a first area of the optical recording medium along a rotating direction of the optical recording medium; and forming, in a second area of the optical recording medium, a continuous groove track having a groove width smaller than a groove width of the first area.

DETAILED DESCRIPTION OF THE PREFERRED EMBODIMENTS

An embodiment of the present invention will now be described in detail hereinbelow with reference to the drawings.

Figure 1:
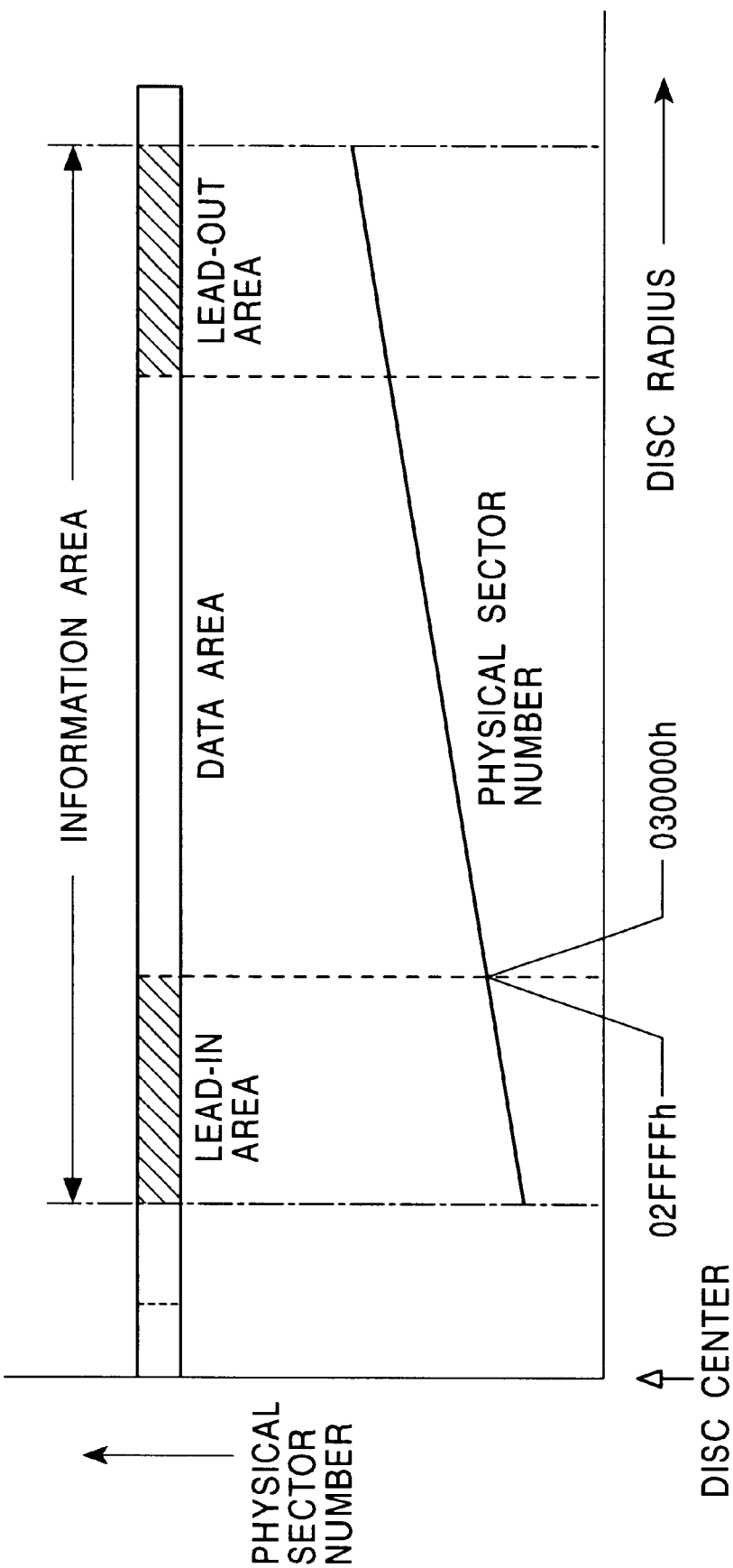
FIG. 1 is a diagram showing a layout of a physical sector in the radial direction of a recording surface of a recorded DVD-ROM.
Figure 2:
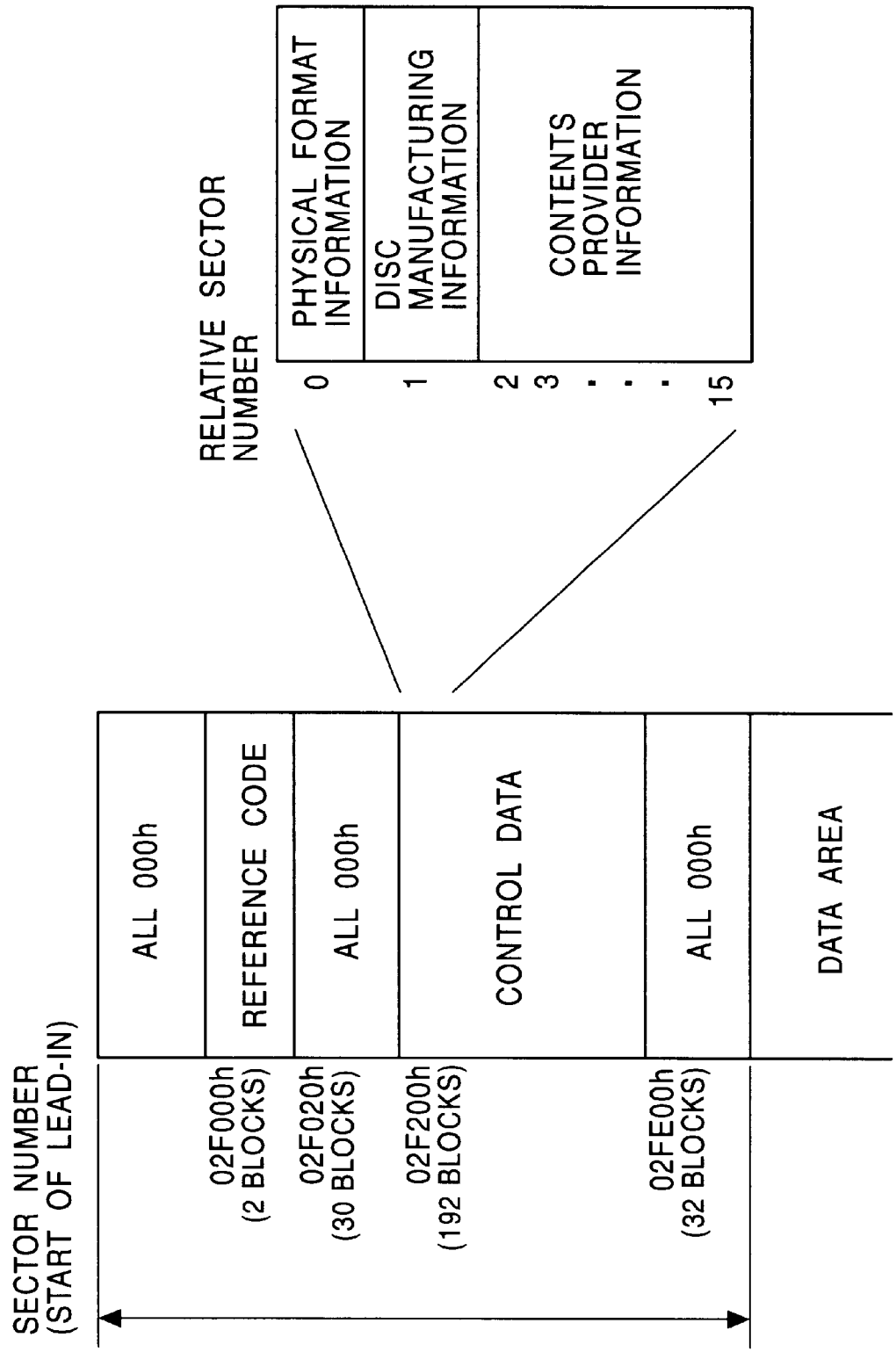
FIG. 2 is a diagram showing a configuration of a lead-in area and a detailed configuration of a control data area.
Figure 3:
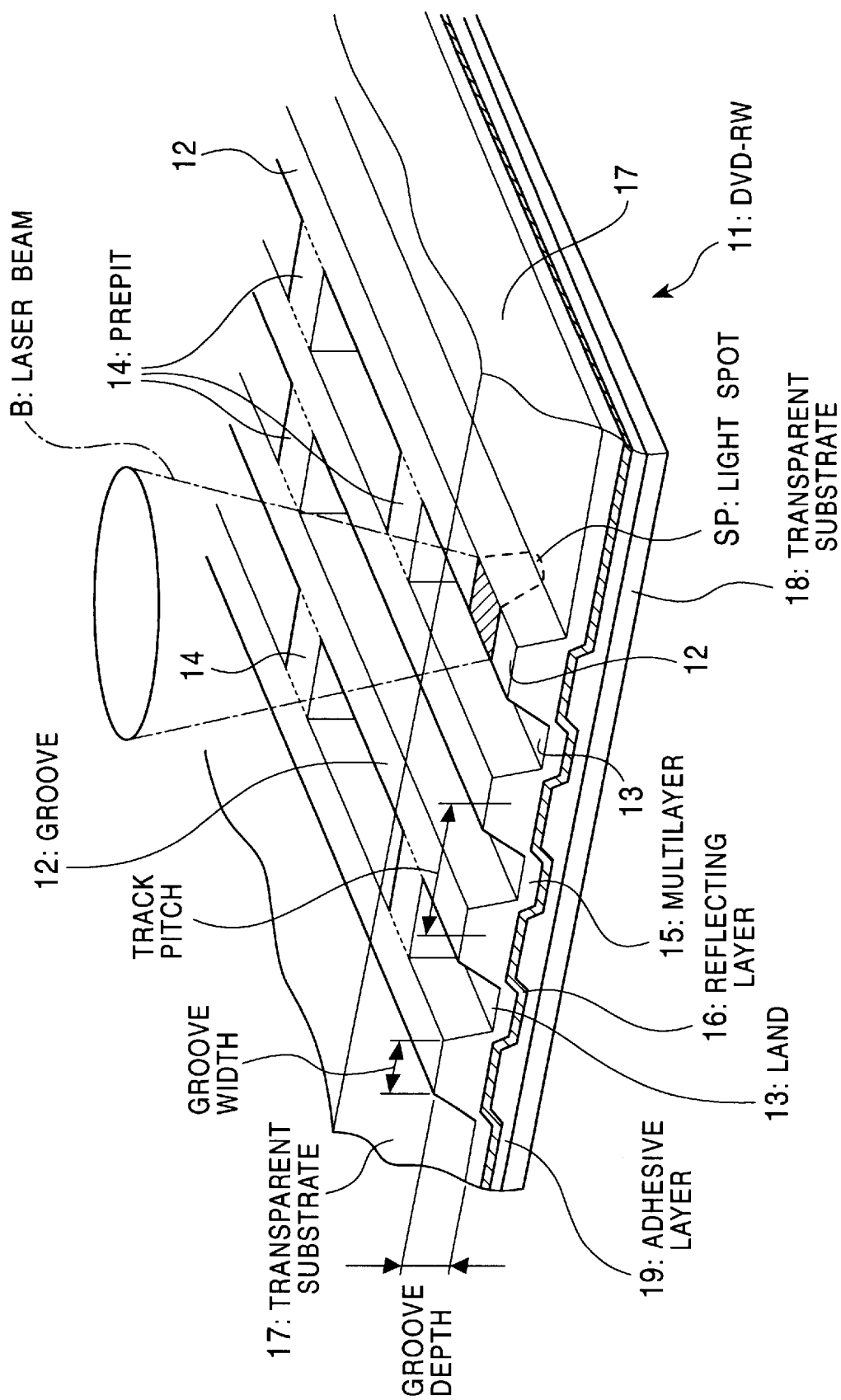
FIG. 3 is a perspective view schematically showing a structure of a recording surface of a DVD-RW disc.

FIG. 3 is a perspective view schematically showing a structure of a recording surface of a conventional DVD-RW disc.

In FIG. 3, an optical disc (DVD-RW) 11 is a phase change type optical disc in which information data is rewritable and which has a multilayer 15 constructed by a recording layer made of a phase change material (for example, GeSbTe) serving as a data recording layer and a protecting layer made of a glass material ($ZnS$—$SiO_2$) which sandwiches the recording layer. Groove tracks 12 and land tracks 13 are formed thereon. The groove tracks 12 serve as information recording tracks and land tracks 13 serve as guide tracks for guiding a laser beam (B) on the groove track 12 for reproduction or recording. The optical disc also has a reflecting layer 16 for reflecting the laser beam (B) when recorded data is reproduced and an adhesive layer 19 for adhering those layers on a transparent substrate (polycarbonate) 18. Further, a transparent substrate (polycarbonate) 17 for protecting the layers is provided on the beam incidence surface of the disc. Prepits 14 corresponding to pre-information (i.e., previously recorded information) are formed on the land track 13. The prepits 14 carry the pre-information which is used by an information recording/reproducing apparatus upon recording or reproduction. The pre-information includes an address information for recognizing a position on the groove track 12 and sync information. The prepits 14 are formed prior to shipment of the optical disc 11.

Further, on the optical disc 11, the groove track 12 has been wobbled at a frequency corresponding to a disc rotational speed. The groove tracks 12 are wobbled prior to shipment of the optical disc 11. On the conventional optical disc 11, the groove tracks 12 have a predetermined groove width and a predetermined groove depth and are formed at a predetermined track pitch.

When recording information data (i.e., information data such as image information to be recorded other than the pre-information) is recorded on the optical disc 11, the wobbling frequency of the groove tracks 12 is extracted in the information recording apparatus for controlling the optical disc 11 to rotate at a predetermined rotational speed. At the same time, the prepits 14 are preliminarily detected to obtain the pre-information. An optimum output of the laser beam (B) as a recording light is determined on the basis of the pre-information. Address information indicating a position on the optical disc 11 where the recording information data should be recorded are obtained on the basis of the pre-information. The recording information data is recorded at the corresponding recording position on the basis of the address information.

When the recording information data is recorded, the laser beam (B) is irradiated so that the beam center coincides with the center of the groove track 12 and recording information pits corresponding to the recording information data are formed on the groove track 12. In this instance, as shown in FIG. 3, a size of the light spot (SP) is set so that a part thereof is irradiated not only to the groove track 12 but also to the land track 13.

The pre-information is detected from the prepits 14 by using a part of reflection light of the light spot (SP) irradiated on the land track 13 by, for example, a push-pull method, so that the pre-information is obtained. The push-pull method (a radial push-pull method) is executed using a photodetector divided or partitioned by a line that is parallel to the tangential direction of the groove track 12 (i.e., the rotating direction of the optical disc 11). Also, a wobble signal is extracted from the groove track 12, so that a clock signal for recording which is synchronized with the rotation of the disc is obtained.

The recording information data to be recorded on the optical disc 11 has previously been divided every sync frame as an information unit. One recording sector is formed by 26 sync frames. One ECC block is formed by 16 recording sectors. One sync frame has a length which is 1488 times (1488T) as long as a channel bit length ("T") that is specified by a recording format at the time when the recording information data is recorded. Further, a head portion of a length of 32T of one sync frame is used as sync information SY for obtaining synchronization of every sync frame.

The groove track 12 is wobbled at a predetermined wobbling frequency f0 (for example, 140 kHz) for all of the sync frames. In the information recording/reproducing apparatus, a signal for rotation control of a spindle motor is detected and the clock signal for recording is generated by extracting the predetermined wobbling frequency f0.

The first embodiment of the present invention will now be described in detail with reference to FIGS. 4 and 5.

Figure 4:
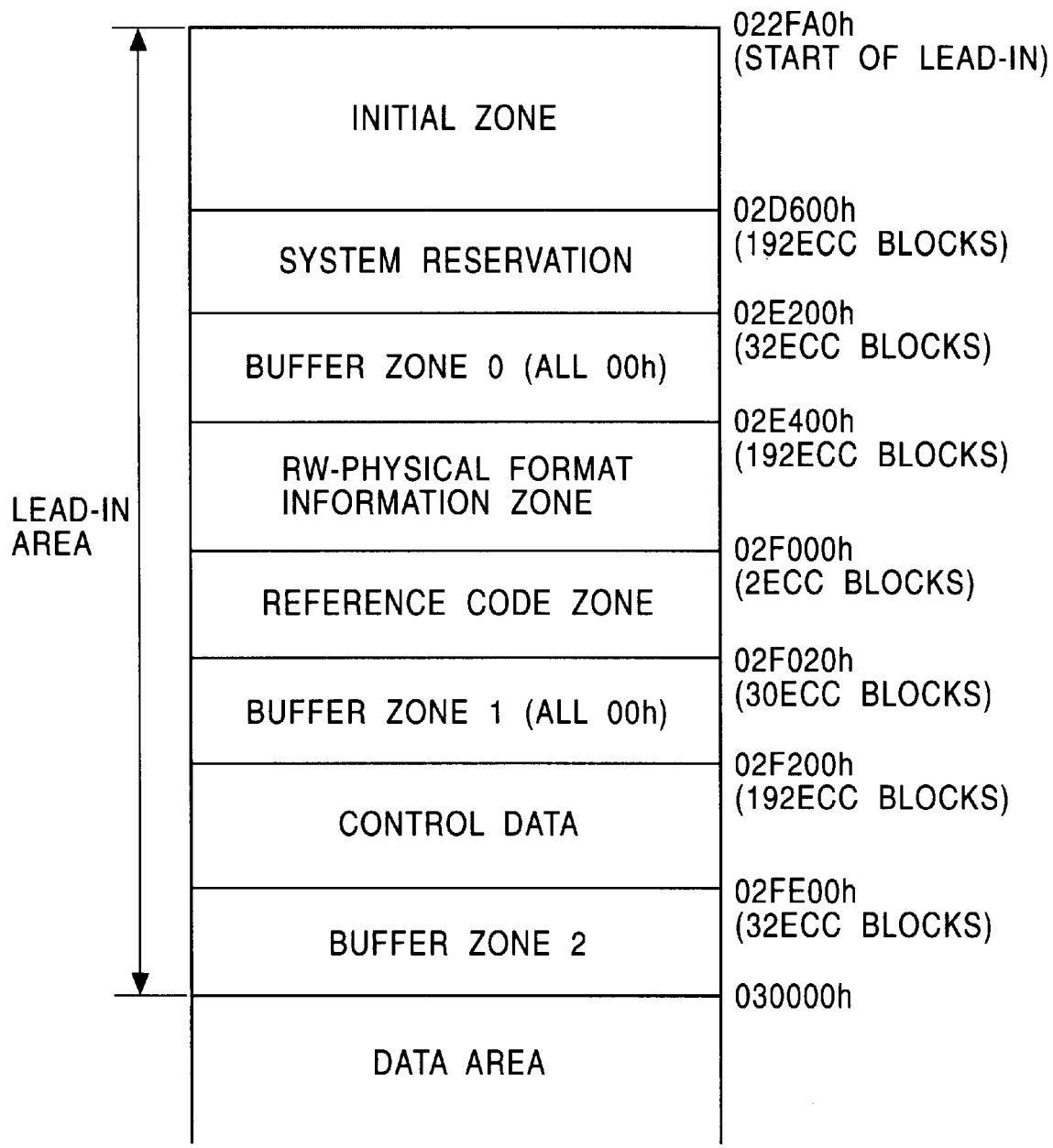
FIG. 4 is a diagram showing a detailed configuration of a lead-in area of a DVD-RW disc.

FIG. 4 shows the details of a lead-in area of a DVD-RW disc. Data such as a reference code, control data, is included in the lead-in area. An RW-physical format information zone is provided and important control data for recording/reproduction control of the disc has been written as phase change pits in the zone. In a control data zone locating at the same address as that of the control data area of the DVD-ROM mentioned above, in order to inhibit recording and reproduction of the control data into/from the area, the groove track is formed in a segmented manner.

Figure 5:
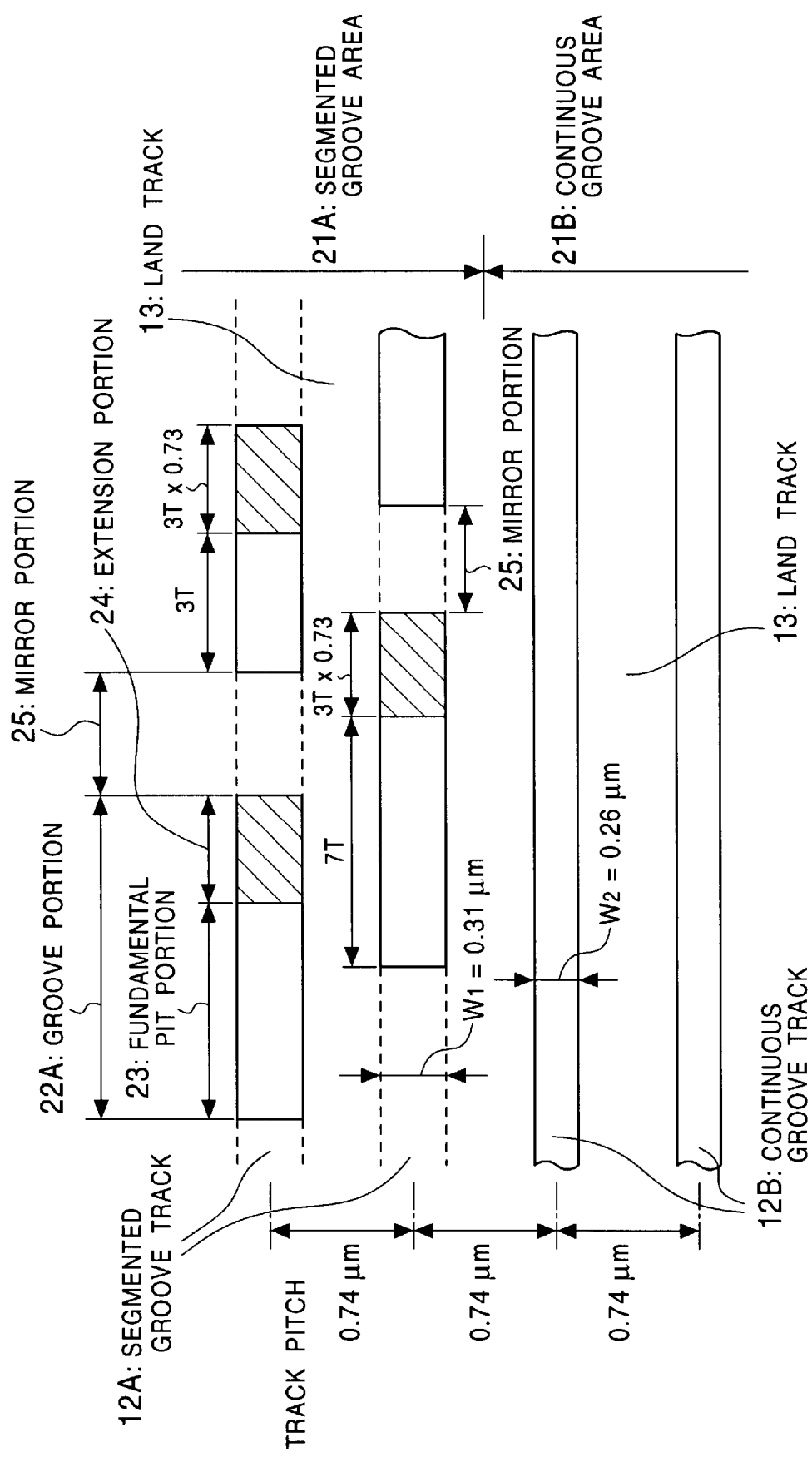
FIG. 5 is a plan view schematically showing a boundary area of a buffer zone 1 and a control data zone of the DVD-RW disc according to the first embodiment of the present invention.

FIG. 5 is a plan view schematically showing a boundary area of the buffer zone 1 and the control data zone on the DVD-RW disc according to the first embodiment of the present invention. The control data zone is a segmented groove area 21A (a first area) comprising segmented groove tracks 12A in which a plurality of groove portions 22A are formed in the rotating direction of the optical disc 11. In other words, the segmented groove track 12A comprises the groove portions 22A and groove non-forming portions (hereinafter, referred to as mirror portions) 25 where no groove is formed. Another area (a second area) such as buffer zone, or data area, etc. is a non-segmented groove area (hereinafter, referred to as a continuous groove area) 21B comprising groove tracks (hereinafter, referred to as continuous groove tracks) 12B in which a groove has been continuously formed (i.e., the groove is not segmented).

In more detail, the segmented groove tracks 12A are alternately arranged and formed at a predetermined track pitch. The continuous groove tracks 12B are also arranged and formed at a predetermined track pitch. Each groove portion 22A of the segmented groove track 12A comprises: a fundamental pit portion 23 serving as either one of a mark portion or a space portion; and an extension portion 24 of a groove having a predetermined length. In other words, the extension portion 24 is a groove portion that is appended continuously to the fundamental pit portion 23. The fundamental pit portion 23 carries a mark portion (or a space portion) while the extension portion 24 and the mirror portion 25 (groove non-forming portion) are included in a space portion (or mark portion).

The segmented groove track 12A is formed by, for example, a method whereby a cutting light beam upon groove cutting is 8/16 modulated and an emitting power is controlled between on and off operation. More particularly, the groove track 12A has an intermittent structure segmented according to a signal of the same frequency band as that of a recording RF signal (i.e., recording signal obtained after 8/16 modulation) which is recorded on the optical disc by the optical disc recording/reproducing apparatus.

Even if the 8/16 modulated control data is recorded on the segmented groove track having the above structure, an amplitude of the RF signal reproduced from the segmented groove track 12A is small, so that the RF signal cannot be read out. This is because the frequency band of the RF signal that is due to the intermittence (i.e., between ON and OFF) of the groove track is equivalent to or comes within that of the recorded RF signal, so that the signals interfere with each other.

In the embodiment, the fundamental pit portion 23 has a pit length corresponding to a mark (or space) of an 8/16 modulation signal S2 in a manufacturing apparatus, which will be explained hereinlater. For example, if the 8/16 modulation for converting data of 8 bits into data of 16 channel bits is used as a modulating method, the minimum pit length of the fundamental pit portion 23 is equal to 3T and the maximum pit length is equal to 11T (T: channel bit length). For example, the maximum pit length is equal to 14T when a pit having a length 14T is used as a sync pattern.

The extension portion 24 has a length of 3T×0.73 based on an extension signal S3, which will be explained hereinlater. A width W1 (in the embodiment, 0.31 μm) of each groove portion 22A on the segmented groove track 12A is larger than a groove width W2 (0.26 μm) of the continuous groove track 12B but is smaller than a half of the track pitch (0.37 μm, the track pitch=0.74 μm).

Description will now be made hereinbelow with regard to how to determine each groove width and each groove length mentioned above. In the embodiment, the segmented groove track 12A is formed so that the duty ratio of all the fundamental pit portions 23 included in the segmented groove track 12A is approximately 50%.

Figure 6:
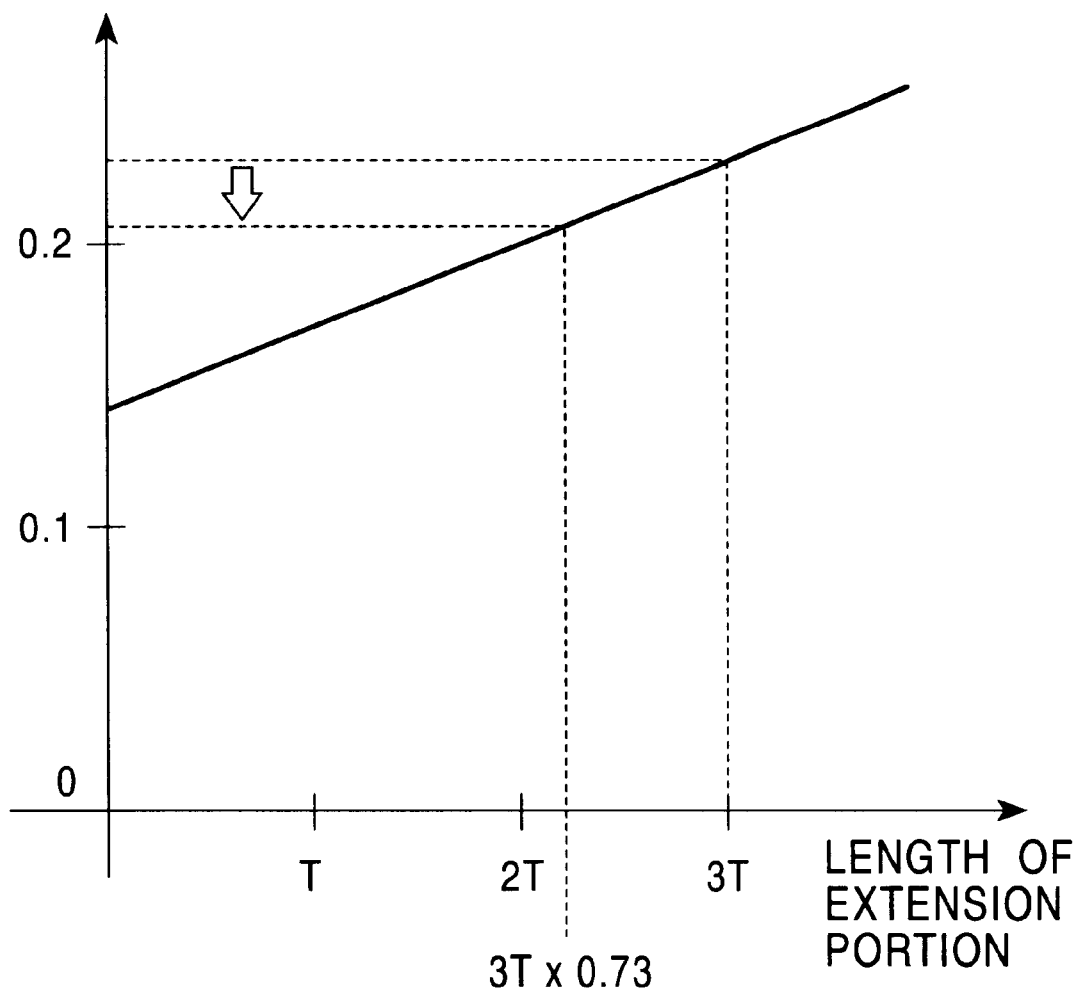
FIG. 6 is a graph showing a push-pull signal level against a length of an extension portion.

FIG. 6 is a graph showing a photodetection signal level in the push-pull method (hereinafter, simply referred to as a push-pull signal level) to the length of extension portion 24. In the embodiment, the groove portion 22A is formed by adding the extension portion 24 to the fundamental pit portion 23 to improve the push-pull signal level for tracking control.

As shown in FIG. 6, the push-pull signal level increases as the extension portion 24 becomes longer. Even if the groove track is formed in a segmented manner, the level of the reproduction RF signal increases by the repetitive recording of the same illegal control data, so that the prevention of the recorded data reading becomes imperfect. The illegal reading can be prevented by shortening the extension portion 24, however, the pushpull signal level decreases as mentioned above and an adverse influence is produced on tracking performance. This trade-off can be solved by optimizing the groove width of the groove portion 22A in addition to the length of the extension portion 24.

Figure 7:
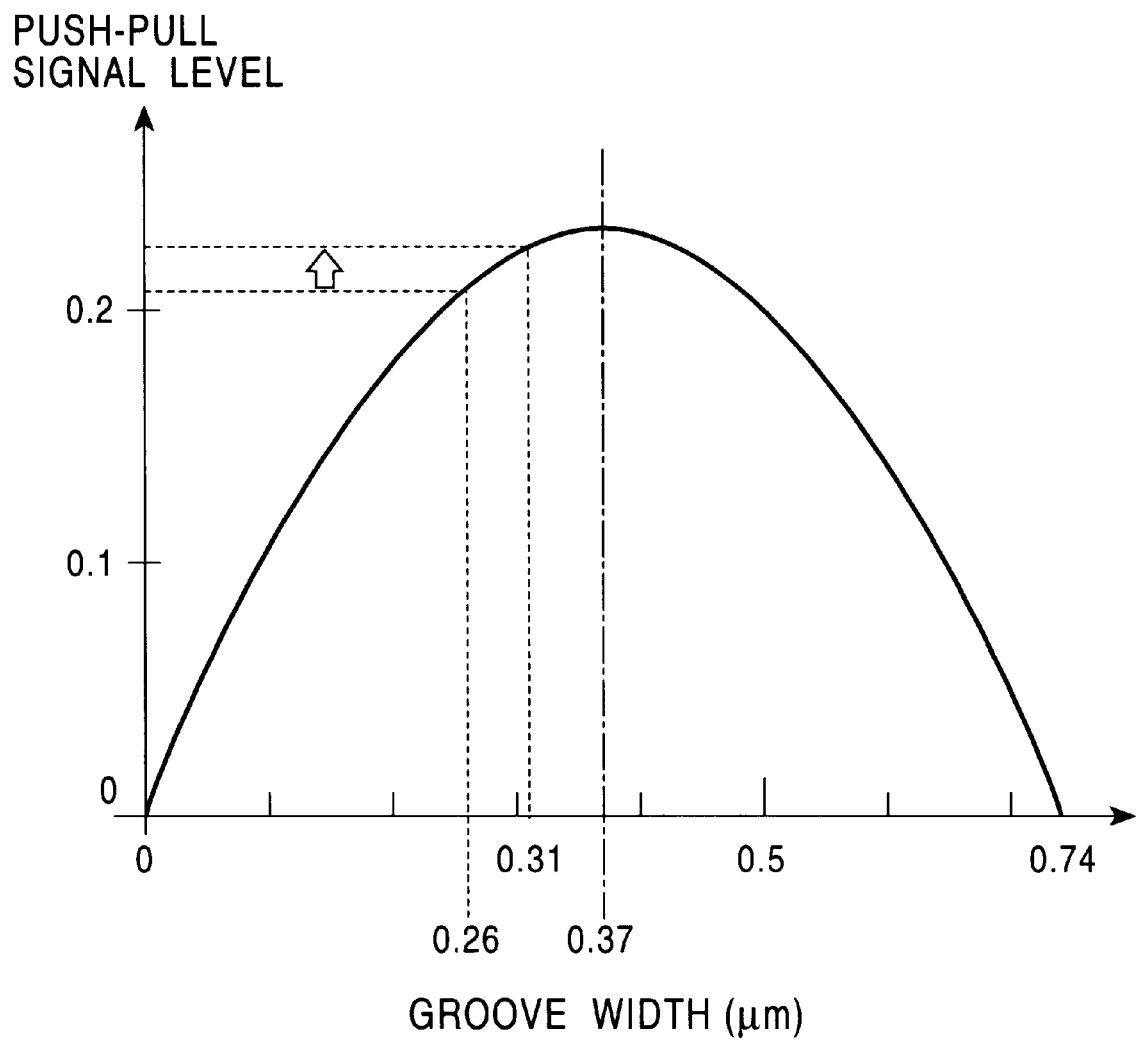
FIG. 7 is a graph showing the push-pull signal level against a groove width.

As shown in FIG. 7, the push-pull signal level changes in accordance with the groove width. The push-pull signal level reaches a maximum value at a value near a half (i.e., 0.37 μm) of the track pitch (0.74 μm). Therefore, the groove width should be determined to lie within a range from the groove width (0.26 μn) of the continuous groove track 12B to a half (i.e., 0.37 μm) of the track pitch (0.74 μm). The length of extension portion 24 should be determined to have a value such that the signal level which does not affect the reproducing operation in consideration of an increased amount of the signal level which is compensated by the increase of the groove width mentioned above.

Figure 8:
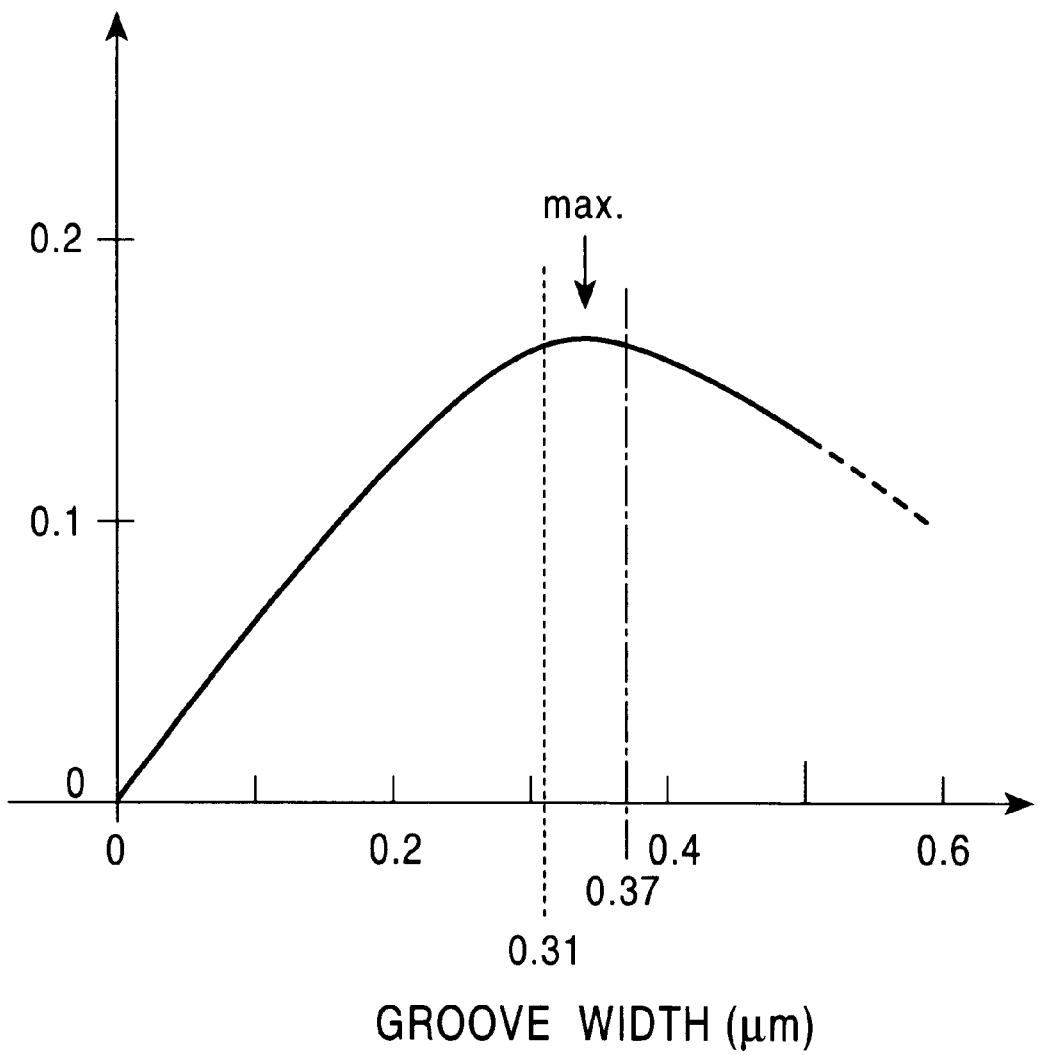
FIG. 8 is a graph showing an RF signal level which is caused due to intermittence of groove tracks against the groove width.

FIG. 8 shows the RF signal level due to the intermittence of the groove track as a function of the groove width. In this calculation, it is assumed that the fundamental pit portion carries data obtained by the 8/16 modulation and the extension portion 24 has a length of 3T×0.73.

The RF signal level that is caused due to the segmented groove track becomes a maximum value at a groove width which is slightly smaller than a half (i.e., 0.37 μm) of the track pitch (0.74 μm). To prevent the illegal reproduction, therefore, the groove width of the groove portion 22A is determined so as to increase the RF signal level.

Therefore, an optical disc can be provided in which the reduction of the push-pull signal level can be avoided and the illegal recording and reproduction can be prevented by determining the groove width of the groove portion 22A, the length of extension portion 24, and the track pitch as mentioned above.

A duty ratio or the like of the fundamental pit portion 23 can be properly changed in consideration of the photodetection signal level.

Although the embodiment has been described with respect to the example in which the extension portion 24 is added to the groove portion 22A, it is not always necessary to provide the extension portion 24. In this instance, the groove width and the length of each groove portion can be determined in accordance with the duty ratio of the groove portion of the segmented groove track in a manner similar to that in the foregoing first embodiment.

Although the embodiment has been described with respect to the example in which the segmented groove track 12A is divided by the signal of the same band as that of the recording RF signal for the optical disc, it can also be segmented by a signal including a part of the band of the recording RF signal. Further, the prepits can also be constructed on the land track.

Figure 9:
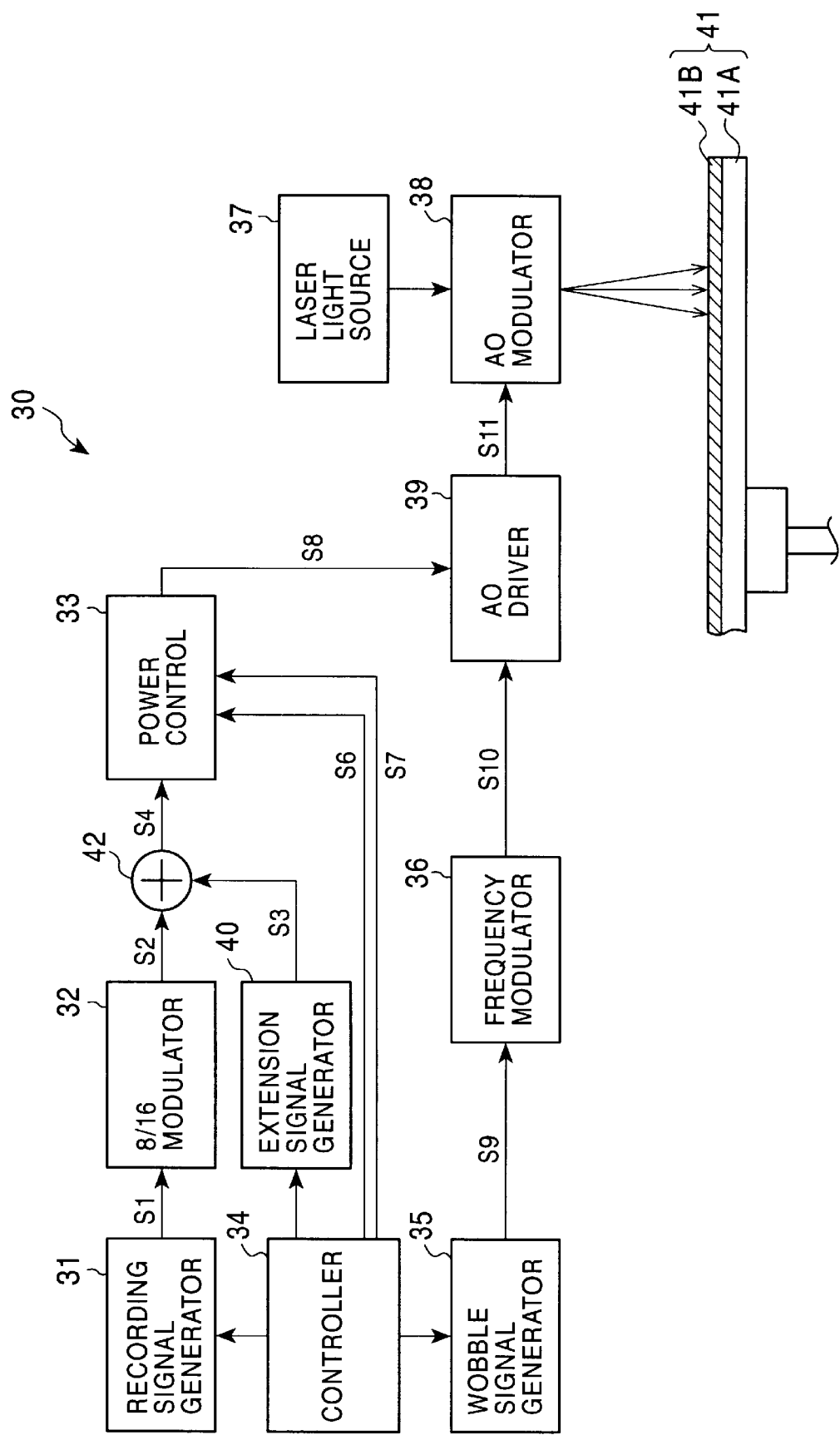
FIG. 9 is a block diagram showing a configuration of a manufacturing apparatus of a master disc of an optical disc.

A manufacturing apparatus of a DVD-RW disc according to the second embodiment of the present invention will now be described in detail with reference to the drawing. FIG. 9 is a block diagram showing a configuration of a manufacturing apparatus 30 of a master disc of an optical disc.

A photoresist 41B is coated on a glass substrate 41A serving as a master disc of the DVD-RW disc and patterned through a conventional photolithography and etching process.

When the laser beam is irradiated in the control data zone (a first area), a dummy control data signal S1 to form the segmented groove track 12A is generated in a recording signal generating circuit 31. The generated dummy data signal S1 is 8/16 modulated in an 8/16 modulator 32. The extension signal S3 used to extend a mark portion of the 8/16 modulation signal S2 by 3T×0.73 is generated in an extension signal generating circuit 40. The extension signal S3 is added to the modulation signal S2 in an adding circuit 42 and an addition signal S4 is supplied to a power control circuit 33.

A groove width control signal S6 to set the width of groove portion to 0.31 μm is supplied from a controller 34 to the power control circuit 33. The power control circuit 33 generates a laser power control signal S8 on the basis of the addition signal S4 and a power control signal S7. The power control signal S8 is supplied to an AO (acousto-optic) modulator 38 through an AO driving circuit 39. The AO modulator 38 turns on/off the laser beam from g'i an argon laser 37 on the basis of the addition signal S4 and adjusts a light power of the laser beam on the basis of the groove width control signal S6.

When the laser beam is irradiated in an area (a second area) other than the control data zone, the control signal S6 for setting the width of grooves to 0.26 μm and the control signal S7 to make the laser beam to be continuously irradiated are supplied from the controller 34 to the power control circuit 33. The AO modulator 38, therefore, allows the laser beam emitted from the argon laser 37 to pass through irrespective of the addition signal S4 and adjusts the laser beam power on the basis of the groove width control signal S6.

A wobble signal generating circuit 35 generates a wobble signal S9 of a sine wave shape to form a wobble to the groove track irrespective of the irradiation area of the laser beam and supplies the signal to a frequency modulator 36. The supplied wobble signal is frequency modulated by the frequency modulator 36, so that a predetermined frequency modulation signal S1 (for example, signal whose center frequency is equal to 140 MHz and which changes in a range from 139 MHz to 141 MHz) is generated.

The frequency modulation signal S10 is supplied to the AO modulator 38 through the AO driving circuit 39. The AO modulator 38 controls an emitting direction of the laser beam from the argon laser 37 on the basis of the frequency modulation signal. As mentioned above, since a power of the laser beam which is supplied to the AO modulator 38 is controlled by the control signal S8, the photoresist 41B is exposed by the laser beam from the AO modulator 38, so that it is possible to form a resist pattern for forming the wobbled segmented groove track 12A having the groove width 0.31 $\mu$m and the wobbled continuous groove track 12B having the groove width 0.26 $\mu$m. A master disc for an optical disc having the segmented groove tracks and the continuous groove tracks can be formed by etching a master disc glass substrate 41 on which the resist pattern has been formed. The optical recording media mentioned above can be manufactured by using the master disc.

The numerical values or the like used in the embodiments are shown as examples and can be properly modified in accordance with the kind of optical recording medium, the light source wavelength of the optical pickup, the optical system, and the like.

As will be obviously understood from the above explanation, according to the present invention, it is possible to provide the optical recording medium and a manufacturing method and apparatus therefor, which can prevent the illegal recording and reproduction of data from the disc.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on a Japanese Patent Application No. 2000-205328 which is hereby incorporated by reference.

What is claimed is:

1. A rewritable optical recording medium having a substrate, land tracks and groove tracks for recording a data signal, the land tracks and the groove tracks being formed in the substrate, and each of the groove tracks being positioned between neighboring ones of the land tracks, respectively, comprising:

a segmented groove area in which the groove track is segmented along a rotating direction of said optical recording medium to form a plurality of groove portions; and a continuous groove area in which a continuous groove track is formed, said continuous groove track having a groove width smaller than groove widths of the plurality of groove portions in said segmented groove area.

2. The medium according to claim 1, wherein the groove width in said segmented groove area is smaller than a half of a groove track pitch.

3. The medium according to claim 1, wherein the groove widths of the plurality of groove portions in said segmented groove area are based on a track pitch of the groove track and lengths of the plurality of groove portions in said segmented groove area.

4. The medium according to claim 1, wherein the groove portions of the segmented groove area are spaced from each other at intervals, and the intervals are based on a part of a frequency band of a data signal which is recorded on said optical recording medium.

5. The medium according to claim 1, wherein said segmented groove area is a control data recording area for recording a reproduction control data signal.

* * * * *